US011112996B2

(12) United States Patent
Hayashi

(10) Patent No.: US 11,112,996 B2
(45) Date of Patent: Sep. 7, 2021

(54) COMPUTER, COMPUTER SYSTEM, AND DATA QUANTITY RESTRICTION METHOD

(71) Applicant: Hitachi, Ltd., Tokyo (JP)

(72) Inventor: Shinichi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 16/320,626

(22) PCT Filed: Nov. 7, 2016

(86) PCT No.: PCT/JP2016/082906
§ 371 (c)(1),
(2) Date: Jan. 25, 2019

(87) PCT Pub. No.: WO2018/083789
PCT Pub. Date: May 11, 2018

(65) Prior Publication Data
US 2019/0179571 A1 Jun. 13, 2019

(51) Int. Cl.
*G06F 3/06* (2006.01)
*G06F 11/10* (2006.01)
(Continued)

(52) U.S. Cl.
CPC ............ *G06F 3/0659* (2013.01); *G06F 3/067* (2013.01); *G06F 3/0613* (2013.01); *G06F 11/10* (2013.01);
(Continued)

(58) Field of Classification Search
CPC ...... G06F 11/2066; G06F 3/065; G06F 3/067; G06F 16/27; G06F 9/45558;
(Continued)

(56) References Cited

U.S. PATENT DOCUMENTS 8,032,725 B1 * 10/2011 Malinowski .......... G06F 11/004
711/162
8,874,749 B1 * 10/2014 Vittal .................... G06F 9/5077
709/226
(Continued)

FOREIGN PATENT DOCUMENTS

JP 4609331 B2 1/2011

OTHER PUBLICATIONS

Failover, High Availability, Clustering RAID and Redundancy Tutorial Guide (Year: 2011).*
(Continued)

*Primary Examiner* — Paul M Knight
(74) *Attorney, Agent, or Firm* — Procopio, Cory, Hargreaves & Savitch LLP

(57) ABSTRACT

With respect to each of one or more entities, a computer sets a sum of an upper-limit NW send quantity and an upper-limit write quantity to a level equal to or lower than an allocation send quantity that is a send quantity allocated for the entity concerned. With respect to each of the one or more entities, the upper-limit NW send quantity is an upper-limit value of the NW send quantity that is the quantity of data to be sent per unit time via an NW I/F of the computer. With respect to each of the one or more entities, an upper-limit write quantity is an upper-limit value of a write quantity that is the quantity of data to be written per unit time to a logical volume recognized by the entity concerned.

13 Claims, 7 Drawing Sheets

(51) Int. Cl.
*G06F 11/14* (2006.01)
*G06F 9/455* (2018.01)

(52) U.S. Cl.
CPC .......... *G06F 11/14* (2013.01); *G06F 9/45558* (2013.01); *G06F 2009/45583* (2013.01)

(58) Field of Classification Search
CPC ...... G06F 3/0613; G06F 3/0659; G06F 11/10; G06F 11/14; G06F 2009/45583
See application file for complete search history.

(56) References Cited

U.S. PATENT DOCUMENTS

| | | | | |
|---|---|---|---|---|
| 9,170,928 | B1* | 10/2015 | Dantkale | G06F 12/0223 |
| 9,172,646 | B2* | 10/2015 | Cardona | H04L 43/0888 |
| 2009/0276771 | A1* | 11/2009 | Nickolov | H04L 67/1014 |
| | | | | 717/177 |
| 2011/0119748 | A1* | 5/2011 | Edwards | G06F 9/45558 |
| | | | | 726/12 |
| 2013/0014263 | A1* | 1/2013 | Porcello | H04L 63/0272 |
| | | | | 726/25 |
| 2014/0297950 | A1* | 10/2014 | Kuwayama | G06F 3/0617 |
| | | | | 711/114 |
| 2016/0164962 | A1* | 6/2016 | Ghosh | H04L 67/1008 |
| | | | | 709/223 |
| 2016/0241491 | A1* | 8/2016 | Tripathi | H04L 49/1523 |

OTHER PUBLICATIONS

Failover and Replication in a Cluster by Oracle (Year: 2015).*
Managing Clustered Data ONTAP® Using the GUI by Netapp (Year: 2015).*
What aggregates are by Netapp (Year: 2015).*

* cited by examiner

FIG.4

OPERATION STATE
50
VIRTUAL VOLUME OPERATION STATE
400

| VM ID | VIRTUAL VOLUME ID | READ QUANTITY | WRITE QUANTITY |
|---|---|---|---|
| VM 1 | Vol 1 | 10 MB/s | 350 MB/s |
| VM 2 | Vol 2 | 100 MB/s | 150 MB/s |
| ⋮ | ⋮ | ⋮ | ⋮ |

VIRTUAL NW I/F OPERATION STATE
410

| VM ID | VIRTUAL NW I/F ID | NW RECEIVE QUANTITY | NW SEND QUANTITY |
|---|---|---|---|
| VM 1 | NW I/F 1 | 350 MB/s | 350 MB/s |
| VM 2 | NW I/F 2 | 150 MB/s | 150 MB/s |
| ⋮ | ⋮ | ⋮ | ⋮ |

FIG.5

I/O UPPER LIMIT
51

| VM ID | VIRTUAL VOLUME ID | UPPER LIMIT READ QUANTITY | UPPER LIMIT WRITE QUANTITY |
|---|---|---|---|
| VM 1 | Vol 1 | 350 MB/s | 350 MB/s |
| VM 2 | Vol 2 | 150 MB/s | 150 MB/s |
| ⋮ | ⋮ | ⋮ | ⋮ |

FIG.6

| | | NW UPPER LIMIT 53 | |
|---|---|---|---|
| 601 | 602 | 603 | 604 |
| VM ID | VIRTUAL NW I/F ID | UPPER LIMIT NW RECEIVE QUANTITY | UPPER LIMIT NW SEND QUANTITY |
| VM 1 | NW I/F 1 | 350 MB/s | 350 MB/s |
| VM 2 | NW I/F 2 | 150 MB/s | 150 MB/s |
| : | : | : | : |

FIG.7

| | NW ALLOCATION POLICY 60 | |
|---|---|---|
| 701 | 702 | 703 |
| VM ID | ALLOCATED RECEIVE QUANTITY | ALLOCATED SEND QUANTITY |
| VM 1 | 700 MB/s | 700 MB/s |
| VM 2 | 300 MB/s | 300 MB/s |
| : | : | : |

| 711 | 712 | 713 | 714 |
|---|---|---|---|
| NW UPPER LIMIT THRESHOLD VALUE | NW LOWER LIMIT THRESHOLD VALUE | I/O UPPER LIMIT THRESHOLD VALUE | I/O LOWER LIMIT THRESHOLD VALUE |
| 90% | 10 MB/s | 90% | 10 MB/s |

NW ALLOCATION POLICY SETTING SCREEN
800

| VM ID | ALLOCATED RECEIVE QUANTITY | ALLOCATION SEND QUANTITY |
|---|---|---|
| VM 1 | 700 MB/s | 700 MB/s |
| VM 2 | 300 MB/s | 300 MB/s |
| : | : | : |

| NW UPPER LIMIT VALUE | NW LOWER LIMIT VALUE | I/O UPPER LIMIT THRESHOLD VALUE | I/O LOWER LIMIT THRESHOLD VALUE |
|---|---|---|---|
| 90% | 10 MB/s | 90% | 10 MB/s |

SETTING

COMPUTER, COMPUTER SYSTEM, AND DATA QUANTITY RESTRICTION METHOD

TECHNICAL FIELD

The present invention generally relates to the limitation of data quantity.

BACKGROUND ART

With respect to the limitation of data quantity, a technology disclosed in Patent Document 1, for example, is known. An apparatus disclosed in Patent Document 1 determines whether each of the upper-limit of the quantity of data to be sent or received by an application and the upper-limit of the quantity of data to be read from or written to a volume satisfies requirements. This apparatus adjusts the upper-limit that does not satisfy the requirements.

PRIOR ART DOCUMENT

Patent Document

Patent document 1: Japanese Patent No. 4609331

SUMMARY OF THE INVENTION

Problems to be Solved by the Invention

A server in which both an application and a storage control function operate is conceivable. An application and a storage control function are each a computer program that is executed by at least one processor. The storage control function provides a volume for storing the data of the application. The application stores the data into that volume. The server has a storage device (typically, a nonvolatile physical storage device) that is the destination of the storage of the data stored in the volume.

The server as described above is generally conceived that has no RAID (Redundant Array of Independent (or Inexpensive) Disks) group configured by a plurality of storage devices. For example, for such a server, a general-purpose computer can be employed; in such a case, the server normally has no RAID group.

For a method of maintaining the redundancy of the data stored in such a server (for example, a method of allowing data access if that server fails), the following method is conceivable, for example. Namely, in addition to the storing data into a storage device in that server, that server stores this data into a storage device in another server. For this purpose, the server sends that data to another server via an NW I/F (Network Interface) of that server. Here, the data transmission to another server via the NW I/F (Network Interface) is referred to as "NW transmission" and the data reception from another server via the NW I/F is referred to as "NW reception."

If an HDD (Hard Disk Drive) is employed as a storage device in the server, it is conceived that the possibility of the saturation of the network band for NW transmission is low. This is because HDDs are generally low in operation speed, so that the quantity of the data writable per unit time is small.

However, if a nonvolatile memory device (typically, an SSD (Solid State Drive) is employed as a storage device in the server, it is conceived that the possibility of the saturation of the network band for NW transmission is higher than the case in which the storage device is an HDD. This is because nonvolatile memory devices are generally higher than HDDs in speed, so that the quantity of the data writable per unit time is higher than that of HDDs.

It is conceived that to set an upper-limit to each of the data quantity of NW transmission (the quantity of the data to be NW transmitted) and the data quantity of volume write (the quantity of the data to be written to a volume) for each application for sharing the NW I/F on the same server. Namely, a technology is conceivable in which the data quantity of NW transmission by an application is limited equal to or lower than the upper-limit and the quantity of the data to be written to a volume by the application is limited equal to or lower than the upper-limit. However, such a technology is not always effective for such a server in which both an application and a storage control function operate as described above. The specific explanation is as follows, for example.

Firstly, when an application executes a large amount of NW transmission, the NW I/F becomes a bottleneck. Therefore, the NW limitation control function arranged on the server limits the data quantity of the NW transmission. Consequently, if a situation occurs in which the storage control function transmits the data to another server with NW transmission because the application has written the data to a volume, the data quantity of that NW transmission can be limited. However, the NW limitation function cannot determine which application has written the data to be transmitted with NW transmission by the storage control function. Therefore, even if any application writes a large quantity of data, the data quantity of the NW transmission is limited, so that the quantity of the data to be written by another application to a volume may be limited.

Secondly, if an application does not write data to a volume with which the application wants only NW transmission, a data quantity (the upper-limit of the data quantity of volume write) allocated for write for that application cannot be used for NW transmission. Likewise, if an application only executes write to a volume and does not execute NW transmission, the data quantity (the upper-limit of the data quantity of NW transmission) allocated for the NW transmission for that application cannot be used for write to the volume.

The same problems occur for NW reception.

Means for Solving the Problems

With respect to each of one or more entities, a computer sets a sum of an upper-limit send quantity and an upper-limit write quantity to a level equal to or lower than an allocation send quantity that is a send quantity allocated for the entity concerned. With respect to each of the one or more entities, the upper-limit send quantity is an upper-limit value of the NW send quantity that is the quantity of data to be sent per unit time via an NW I/F of the computer. With respect to each of the one or more entities, an upper-limit write quantity is an upper-limit value of a write quantity that is the quantity of data to be written per unit time to a logical volume recognized by the entity concerned.

Effect of the Invention

Optimization is expected of both an NW send quantity and a write quantity with respect to each of one or more entities sharing a same NW I/F.

BRIEF DESCRIPTION OF THE DRAWINGS

FIG. 4 illustrates an example of operation states.

FIG. 5 illustrates an example of an upper-limit of an I/O (Input/Output).

FIG. 6 illustrates an example of a NW upper-limit.

FIG. 7 illustrates an example of a NW allocation policy.

MODES FOR CARRYING OUT THE INVENTION

Figure 1:
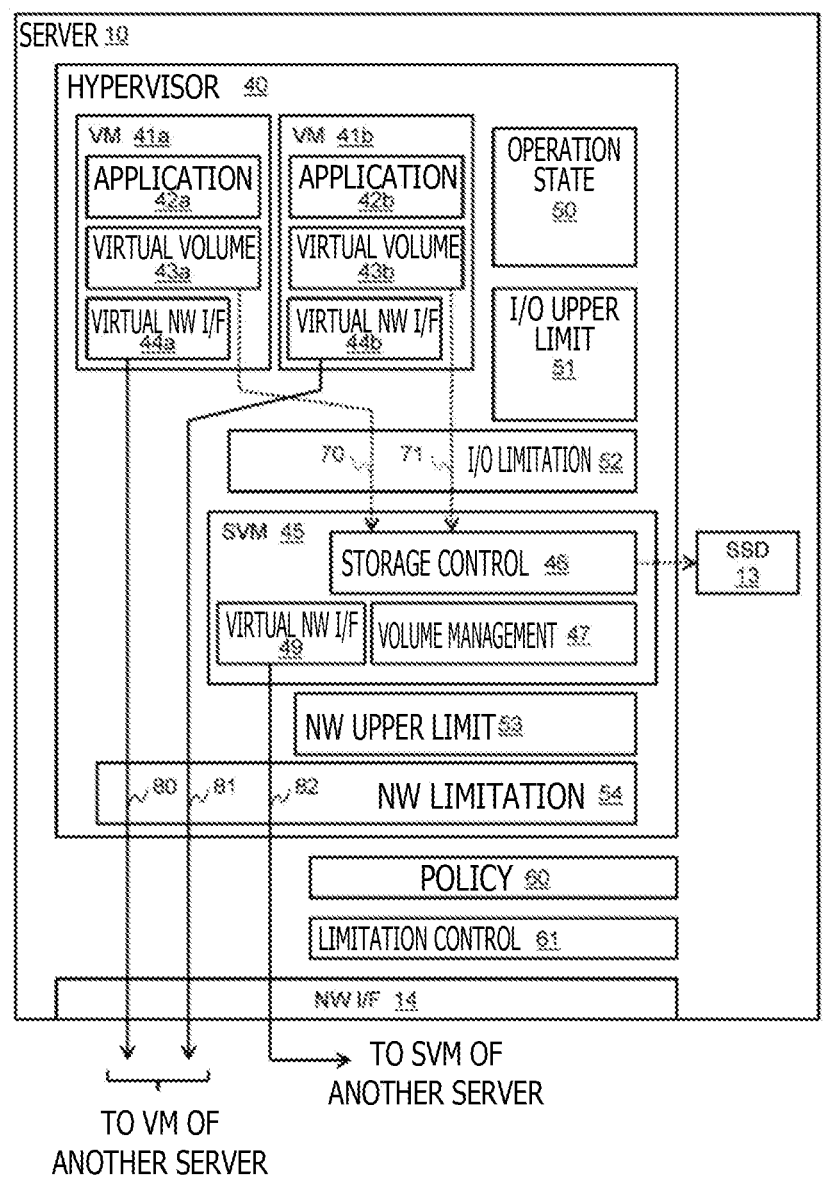
FIG. 1 illustrates an example of a configuration of a server related with embodiment 1.

The following describes embodiments.

It should be noted that, in what follows, if the description is done without distinction between similar elements, reference characters (or common parts in a reference code) are used; if distinction is done between similar elements, the ID (or the reference code) of each element may be used.

Further, in the following description, numbers are used for the identification of elements; however, it is also practicable to use other codes instead of or in addition of numbers.

Still further, in the following description, processing may be described with "a program" as subject; however, since a program is executed by a processor (a CPU (Central Processing Unit) for example) so as to execute specified processing by appropriately using a storage block (a memory, for example) and/or an interface device (a communication port, for example), the subject of processing may be a processor (or an apparatus or a system that has that processor). In addition, a processor may have a hardware circuit that executes a part or all of processing. A program may be installed in an apparatus such as a computer from a program source. The program source may be a program distribution server or a computer-readable storage medium, for example. Also, in the following description, two or more programs may be realized as one program or one program may be realized as two or more programs. It should be noted that "a program" is "an application" and "xxx function" ("xxx" is a function name).

Yet further, at least one of xxx functions to be described below may be realized by a hardware circuit such as ASIC (Application Specific Integrated Circuit) or FPGA (Field-Programmable Gate Array). In what follows, two or more xxx functions may be realized as one function or one xxx function may be realized as two or more xxx functions.

In the following description, one example of information is a table. One table may be divided into two or more tables or all or parts of two or more tables may be one table.

Embodiment 1

Now, referring to FIG. 1, there is illustrated an example of a configuration of a server 10 related with embodiment 1.

The server 10 illustrated in FIG. 1 is any one of two or more servers 10. Each of one or more severs 10 other than the server 10 illustrated in FIG. 1 can have substantially the same configuration as the server 10. In what follows, in order to prevent the confusion in description, the server 10 illustrated in FIG. 1 is simply referred to as "the server 10" while any one of the servers 10 other than the server 10 illustrated in FIG. 1 is referred to "another server."

The server 10 is one example of a computer. The server 10 has an SSD 13 that is one example of a storage device, an NW I/F 14 that is one example of "an interface," a hypervisor 40, an operation state acquisition function (not depicted) for acquiring an operation state 50 to be described later, an NW allocation policy 60, and a limitation control function 61.

The SSD 13 stores data of an application 42 that is executed in the hypervisor 40 in the server 10. The NW I/F 14 connects the server 10 and another server 10 with each other.

The hypervisor 40 has a VM (Virtual Machine) 41, an SVM (Storage VM) 45, the operation state 50, an I/O upper-limit 51, an I/O limitation function 52, and an NW limitation function 54. The VM 41 is one example of a virtual server and has the application 42, a virtual volume 43, and virtual NW I/F 44. According to the example illustrated in FIG. 1, a VM 41a and VM 41b are arranged. The VM 41a has an application 42a, a virtual volume 43a, and a virtual NW I/F 44a. The VM 41b has an application 42b, a virtual volume 43b, and a virtual NW I/F 44b. One VM 41 may execute a plurality of applications 42. The SVM 45 is one example of a virtual storage and has a virtual NW I/F 49, a storage control function 46, and a volume management information 47. Physical resources (a CPU, a memory, and the NW I/F 14 to be described later, for example) of the server 10 are allocated to both the VM 41 and the SVM 45. For example, the virtual NW I/F 44 in the VM 41 and the virtual I/F 49 in the SVM 45 are based on the NW I/F 14.

The application 42 operate on the VM 41. The application 42 is a database management system, for example. When the application 42 writes data, a write instruction is issued to the virtual volume 43. The virtual volume 43 is a volume (a logical volume) recognized by the application 42 mounted on the VM 41 provided by the storage control function 46. When the application 42 reads data, a read instruction is issued to the virtual volume 43. Each of the read instruction and the write instruction issued to the virtual volume 43 is received and processed by the storage control function 46 in the SVM 45. When the application 42 communicates with another application 42 in the server 10, data is sent/received by use of the virtual NW I/F 44. Namely, the communication (typically, the communication between the VMs 41) between the applications 42 in the server 10 is executed via the virtual NW I/F 44. When the application 42 communicates with an application 42 in another server 10, data is sent/received by use of the NW I/F 14. Namely, the communication between the application 42 in the server 10 and the application 42 in another server 10 is executed via the NW I/F 14.

The following describes data write processing. The application 42a is used for an example. The application 42a issues a write instruction to the virtual volume 43a and the storage control function 46 in the SVM 45 receives this write instruction (refer to dashed-line arrow 70). Referencing this write instruction and the volume management information 47, the storage control function 46 identifies a write destination server. The storage control function 46 may identify a write destination server by computation based on the write instruction without referencing the volume management information 47. If a write destination server is the server 10, then the storage control function 46 transfers the write instruction to the SSD 13 in the server 10. If a write destination server is another server 10*b* (one example of another server 10 (refer to FIG. 2)), then the storage control function 46 transfers the write instruction to the storage control function 46 of another server 10*b* via a virtual NW I/F 44*c* and the NW I/F 14. The storage control function 46 in another server 10*b* receives the write instruction from the server 10, transfers the received write instruction to the SSD 13 in another server 10*b*, and returns a result thereof (write completed, for example) to the server 10 that is the send source of the write instruction. As described, in order to prevent the data loss due to the failure of the server 10, data is written to each of two or more servers 10 including the server 10. This is the processing to be executed if the application 42*a* writes data.

The following describes data read processing. The application 42*a* is used for an example. The application 42*a* issues a read instruction to the virtual volume 43*a* and the storage control function 46 in the SVM 45 receives this read instruction. Referencing this read instruction and the volume management information 47, the storage control function 46 identifies a read source server. The storage control function 46 may identify a read source server by computation based on the write instruction without referencing the volume management information 47. If a read source server is the server 10, then the storage control function 46 transfers the read instruction to the SSD 13. If a read source server is another server 10*b*, then the storage control function 46 transfers the read instruction to the storage control function 46 of another server 10*b* via the virtual I/F 49 and the NW I/F 14. The storage control function 46 in another server 10*b* receives the read instruction from the server 10, transfers the received read instruction to the SSD 13 in another server 10*b*, and returns a result thereof (read data, for example) to the server 10 that is the send source of the read instruction. This is the processing to be executed if the application 42*a* reads data.

The operation state 50 holds a read quantity and a write quantity for each virtual volume 43 and an NW send quantity and an NW receive quantity for each virtual NW I/F 44. "Read quantity" of the virtual volume 43 denotes a quantity of the data read per unit time by the virtual volume 43. "Write quantity" of the virtual volume 43 denotes the quantity of the data written per unit time by the virtual volume 43. "NW send quantity" of the virtual NW I/F 44 denotes the quantity of the data that is sent per unit time via the virtual NW I/F 44 and the NW I/F 14. "NW receive quantity" of the virtual NW I/F 44 denotes the quantity of the data that are received per unit time via the virtual NW I/F 44 and the NW I/F 14. In the operation state 50, both the NW send quantity and the NW receive quantity exist for each virtual NW I/F 44 and may not exist for the virtual I/F 49 in the SVM 45.

The I/O upper-limit 51 is setting values of the upper-limit read quantity (the upper-limit of a read quantity) and the upper-limit write quantity (the upper-limit of a write quantity) for each virtual volume 43. On the basis of the I/O upper-limit 51, the I/O limitation function 52 is a function for limiting a read quantity (a quantity of the data to be read via the storage control function 46) and a write quantity (a quantity of the data to be written via the storage control function 46) with respect to the virtual volume 43 of an I/O destination (write destination or read source). It should be noted that a dashed-line arrow 70 is indicative of write from the virtual volume 43*a* to the storage control function 46. A dashed-line arrow 71 is indicative of write from the virtual volume 43*b* to the storage control function 46.

The NW upper-limit 53 is setting values of the upper-limit NW send quantity (the upper-limit of an NW send quantity) and the upper-limit NW receive quantity (the upper-limit of an NW receive quantity) for each virtual NW I/F 44. The NW upper-limit 53 may not include such settings with respect to the virtual I/F 49 in the SVM 45.

The NW limitation function 54 is a function for limiting an NW send quantity and an NW receive quantity with respect to the virtual NW I/F 44 on the basis of the NW upper-limit 53. The NW limitation function 54 does not limit an NW send quantity and an NW receive quantity with respect to the virtual I/F 49 in the SVM 45. This is because the NW upper-limit 53 does not include the upper-limit NW send quantity and the upper-limit NW receive quantity with respect to the virtual I/F 49. It should be noted that, even if the NW upper-limit 53 includes such settings with respect to the virtual I/F 49, the NW limitation function 54 is capable of not limiting an NW send quantity and an NW received quantity with respect to the virtual I/F 49.

In FIG. 1, a solid-line arrow 80 is indicative of send from the virtual NW I/F 44*a* to another server 10 (the VM 41) via the NW I/F 14. An arrow 81 is indicative of send from the virtual NW I/F 44*b* to another server 10 (the VM 41) via the NW I/F 14. An arrow 82 is indicative of send from the virtual I/F 49 to anther server 10 (the SVM 45) via the NW I/F 14. For example, if the VM 41*a* (41*b*) exports data, NW send (a data send operation) indicated with the solid-line arrow 80 (81) is executed but the data transfer indicated with the solid-line arrow 82 is not executed. On the other hand, if the VM 41*a* (41*b*) writes data to the virtual volume 43*a* (43*b*), the data transfer indicated with the solid-line arrow 82 is executed but the NW send indicated with the solid-line arrow 80 (81) is not executed. It should be noted that, if the VM 41*a* (41*b*) imports data, NW receive (a data reception) that is inverse to the direction indicated with the solid-line arrow 80 (81) is executed. If the VM 41*a* (41*b*) reads data from the virtual volume 43*a* (43*b*), then, if the data to be read is found in the SSD 13 in another server 10, the data transfer that is inverse to the direction indicated with the solid-line arrow 82 is executed.

The NW allocation policy 60 is a policy for defining an allocated send quantity and an allocated receive quantity for each VM 41. "Allocated send quantity" denotes the upper-limit of a total of the data quantity of NW send and the data quantity of a volume write (a write operation to a virtual volume). "Allocated receive quantity" denotes the upper-limit of a total of the data quantity of NW receive and the data quantity of volume read (a read operation from a virtual volume).

The limitation control function 61 is a function for changing the I/O upper-limit 51 on the basis of the operation state 50 and the NW upper-limit 53 on the basis of NW allocation policy 60.

Figures 2, 3:
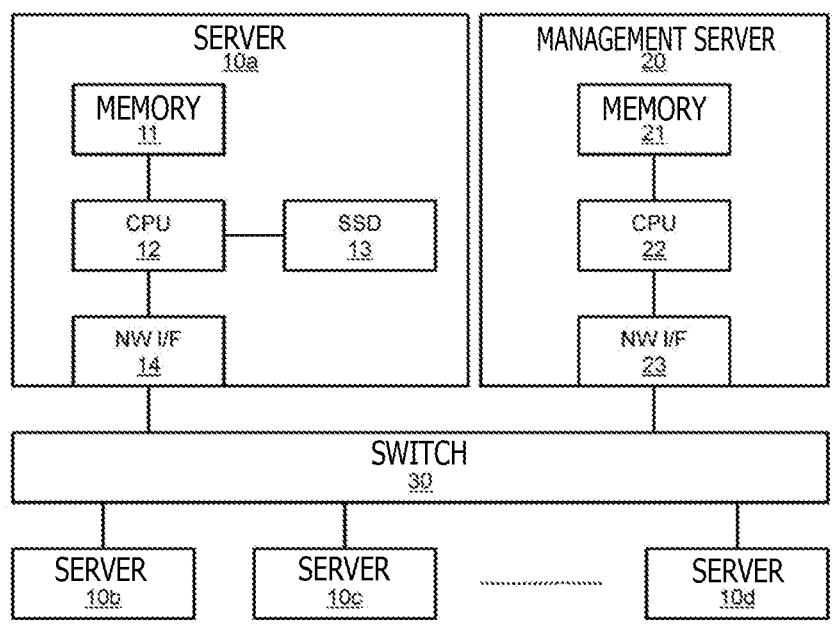
FIG. 2 illustrates an example of a configuration of a computer system related with embodiment 1.
FIG. 3 illustrates an example of volume management information.

Referring to FIG. 2, there is illustrated an example of a configuration of a computer system related with embodiment 1.

The computer system has a plurality of servers 10*a*, 10*b*, 10*c*, 10*d* and . . . , and a management server 20, and a switch 30. The number of servers may be two or more. The switch 30 may be a single switch such as a PCI-Express switch or one or more network switches (for example, a communication network such as LAN (Local Area Network)).

The server 10*a* is the server 10 illustrated in FIG. 1 and has a memory 11, the SSD13, the NW I/F 14, and a CPU (Central Processing Unit) 12 connected thereto. The data of the hypervisor 40, an operation state acquisition function not depicted, the NW allocation policy 60, and the limitation control function 61 are stored in the memory 11. Any one of servers other than server 10*a* is one example of another server. The NW I/F 14 is connected to the switch 30. The server 10 (the server 10*a*) is communicable with another server 10 via the switch 30.

The management server 20 has a memory 21, an NW I/F 23, and a CPU 22 connected thereto. The NW I/F 23 is connected to the switch 30. The management server 20 is communicable with at least one of a plurality of servers 10*a*, 10*b*, 10*c*, 10*d* and . . . via the switch 30.

Referring to FIG. 3, there is illustrated an example of the volume management information 47.

The volume management information 47 is information that is created, referenced, and updated by the storage control function 46. The volume management information 47 is stored in the memory 11 or the SSD 13, for example. The volume management information 47 is a table, for example, and has information such as a virtual volume ID 301, a capacity 302, a VM ID 303, a first server ID 304, a second server ID 305, and a third server ID 306 for each virtual volume 43.

The virtual volume ID 301 is indicative of the ID of the 43 concerned. The capacity 302 is indicative of the capacity of the virtual volume 43 concerned. The VM ID 303 is indicative of the ID of the VM 41 that uses the virtual volume 43 concerned. The first server ID 304 is indicative of the ID of a server that stores the virtual volume 43 concerned. Each of the second server ID 305 and the third server ID 306 is indicative of the ID of a server to which data to be stored in the virtual volume 43 is transferred (stored). If the server 10 (the first server) fails, the data of any other servers (the second server or the third server) can be accessed. The data to be stored in the virtual volume 43 in the server 10 is stored in N units of other servers (N being 1 or more). Writing data to N units of other servers can be referred to as "(N+1)-fold write." With a virtual volume for which double write (N=1) is employed, the third server ID 306 is left blank.

Referring to FIG. 4, there is illustrated an example of the operation state 50.

The operation state 50 is the information that is created and updated by the hypervisor 40. The operation state 50 is stored in a storage block of the server 10, for example, in the memory 11 or the SSD 13. The operation state 50 has a virtual volume operation state 400 and a virtual NW I/F operation state 410.

The virtual volume operation state 400 is a table, for example, and has a VM ID 401, a virtual volume ID 402, a read quantity 403, and a write quantity 404 for each virtual volume 43. The VM ID 401 is indicative of the ID of the VM 41 that accesses the virtual volume 43 concerned. The virtual volume ID 402 is indicative of the ID of the virtual volume 43 concerned. The read quantity 403 is indicative of the quantity of the data read by the virtual volume 43 concerned indicated by the VM ID 401 per unit time. The write quantity 404 is indicative of the quantity of the data written to the virtual volume 43 concerned by the VM 41 indicated by the VM ID 401 per unit time.

The virtual NW I/F operation state 410 is a table, for example, and has a VM ID 411, a virtual NW I/F ID 412, an NW receive quantity 413, an NW send quantity 414 for each virtual NW I/F 44. The VM ID 411 is indicative of the ID of the VM 41 having the virtual NW I/F 44 concerned. The virtual NW I/F ID 412 is indicative of the ID of the virtual NW I/F 44 concerned. The NW receive quantity 413 is indicative of the quantity of the data received (inputted) by the VM 41 indicated by the VM ID 411 via the virtual NW I/F 44 (and the NW I/F 14) per unit time. The NW send quantity 414 is indicative of the quantity of the data sent (outputted) by the VM 41 indicated by the VM ID 411 via the virtual NW I/F 44 (and the NW I/F 14) per unit time.

In the present embodiment, in each of two or more servers 10*a*, 10*b*, 10*c*, 10*d* and . . . , the NW I/F 14 communicates in full duplex. Therefore, the increase or decrease in one of NW send quantity and NW receive quantity does not affect the increase or decrease of the other. The communication scheme of the NW I/F 14 may not be restricted to full duplex.

Referring to FIG. 5, there is illustrated an example of the I/O upper-limit 51.

The I/O upper-limit 51 is the information that is updated by the limitation control function 61 and referenced by the pyramid filter block 52. The I/O upper-limit 51 is stored in a storage block of the server 10; for example, in the memory 11 or the SSD 13. The I/O upper-limit 51 is a table, for example, and has a VM ID 501, a virtual volume ID 502, an upper-limit read quantity 503, and an upper-limit write quantity 504 for each virtual volume 43. The VM ID 501 is indicative of the ID of the VM 41 that accesses the virtual volume 43 concerned. The virtual volume ID 502 is indicative of the ID of the virtual volume 43 concerned. The upper-limit read quantity 503 is indicative of the upper-limit of the read quantity of the virtual volume 43 concerned, namely, the upper-limit value of the quantity of the data that the VM 41 indicated by the VM ID 501 can read from virtual volume 43 per unit time. The upper-limit write quantity 504 is indicative of the upper-limit of the write quantity of the virtual volume 43 concerned, namely, the upper-limit value of the quantity of the data that the VM 41 indicated by the VM ID 501 can write to the virtual volume 43 concerned per unit time.

Referring to FIG. 6, there is illustrated an example of the NW upper-limit 53.

The NW upper-limit 53 is the information that is updated by the limitation control function 61 and referenced by the NW limitation function 54. The NW upper-limit 53 is stored in a storage block of the server 10; for example, in the memory 11 or the SSD 13. The NW upper-limit 53 is a table, for example, and has a VM ID 601, a virtual NW I/F ID 602, an upper-limit receive quantity 603, and an upper-limit send quantity 604. The VM ID 601 is indicative of the ID of the VM 41 having the virtual NW I/F 44 concerned. The NW I/F ID 602 is indicative of the ID of the virtual NW I/F 44 concerned. The upper-limit NW receive quantity 603 is indicative of the upper-limit of the NW receive quantity 413 of the virtual NW I/F 44 concerned, namely, the upper-limit value of the quantity of the data that the VM 41 indicated by the VM ID 601 can receive per unit time via the virtual NW I/F 44 concerned. The upper-limit NW send quantity 604 is indicative of the upper-limit of the NW send quantity 414 of the virtual NW I/F 44 concerned, namely, the upper-limit value of the quantity of the data that the VM 41 indicated by the VM ID 601 can send per unit time via the virtual NW I/F 44 concerned.

Referring to FIG. 7, there is illustrated an example of the NW allocation policy 60.

The NW allocation policy 60 is the information that is created by the manager of the computer system (or automatically created by the limitation control function 61 on the basis of the information of the scale of the VM 41 or the information of another type) and is referenced by the limitation control function 61. The NW allocation policy 60 is stored in a storage block of the server 10; for example, in the memory 11 or the SSD 13. The NW allocation policy 60 has a VM ID 701, an allocation receive quantity 702, and an allocation send quantity 703 for each VM 41. In addition, the NW allocation policy 60 has an NW upper-limit threshold value 711, an NW lower-limit threshold value 712, an I/O upper-limit threshold value 713, and an I/O lower-limit threshold value 714 as the information common to all VMs 41.

The VM ID 701 is indicative of the ID of the VM 41 concerned.

The allocation receive quantity 702 is indicative of the upper-limit value of a total of the data quantity of NW receive and the data quantity of volume read with respect to the VM 41 concerned. "The data quantity of NW receive" of the VM 41 is the quantity of the data that the VM 41 concerned receives per unit time via the virtual NW I/F 44 and the NW I/F 14. "The data quantity of volume read" of the VM 41 is the quantity of the data to be read per unit time via the virtual volume 43 and the virtual I/F 49 in the VM 41 concerned, and the NW I/F 14. "The data to be read" is a data read from the SSD 13 in another server 10. The allocation receive quantity 702 is based on an NW I/F receive quantity that is a data quantity receivable by the NW I/F 14 per unit time (for example, this data quantity may be all or part of the NW I/F receive quantity). A total of two or more allocation receive quantities 702 each corresponding to a plurality of VMs 41 may be the NW I/F receive quantity or less.

The allocation send quantity 703 is indicative of the upper-limit value of a total of the data quantity of NW send and the data quantity of volume write with respect to the VM 41. "The data quantity of NW send" of the VM 41 is the quantity of the data to be sent by the VM 41 concerned per unit time via the virtual NW I/F 44 and the NW I/F 14. "The data quantity of volume write" of the VM 41 is the quantity of the data to be written to the virtual volume 43 in the VM 41 concerned per unit time. "The data to be written" is the data to be written to the SSD 13 in another server 10. The allocation send quantity 703 is based on the I/F send quantity that is the data quantity that the NW I/F 14 can send per unit time (for example, this data quantity may be all or part of the NW I/F send quantity). A total of a plurality of allocation send quantities 703 each corresponding to a plurality of VMs 41 may be the NW I/F send quantity or less.

The NW upper-limit threshold value 711 is the threshold value of the ratio of the NW receive quantity 413 to the upper-limit NW receive quantity 603 and the threshold value of the ratio of the NW send quantity 414 to the upper-limit NW send quantity 604 with respect to each VM 41. The NW lower-limit threshold value 712 is the lower-limit value of each of the upper-limit NW receive quantity 603 and the upper-limit NW send quantity 604 with respect to each VM 41. The I/O upper-limit threshold value 713 is the threshold value of the ratio of the read quantity 403 to the upper-limit read quantity 503 and the threshold value of the ratio of the write quantity 404 to the upper-limit write quantity 504 with respect to each VM 41. The I/O lower-limit threshold value 714 is the lower-limit value of each of the upper-limit read quantity 503 and the upper-limit write quantity 504 with respect to each VM 41.

It should be noted that the allocation receive quantity 702 and the allocation send quantity 703 may be the information common to all VMs 41 instead of the information particular for each VM 41. At least one of the NW upper-limit threshold value 711, the NW lower-limit threshold value 712, the I/O upper-limit threshold value 713, and the I/O lower-limit threshold value 714 may be the information particular for each VM 41 instead of the information common to all VMs 41.

Further, in the information illustrated in at least one of FIG. 4 through FIG. 7, the information for each virtual volume 43 or the information for each virtual NW I/F 44 may be the information for each application 42 or the information for each VM 41. Still further, in the information indicated in at least one of FIG. 4 through FIG. 7, the information for each VM 41 may be the information for each application 42.

Figures 8, 9:
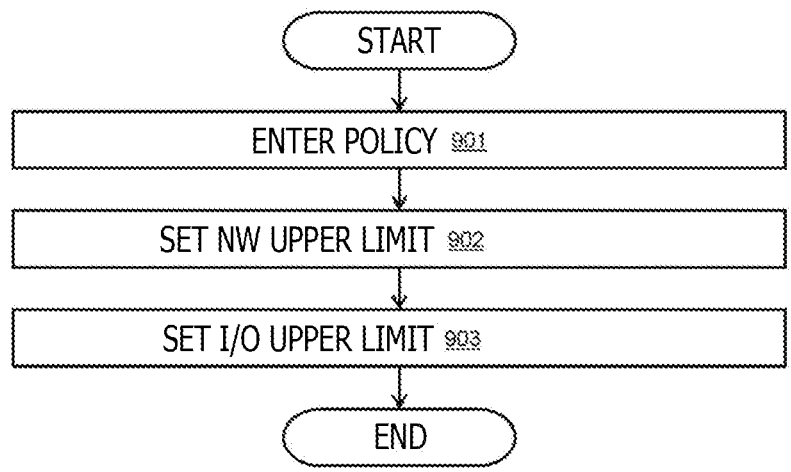
FIG. 8 illustrates an example of a NW allocation policy setting screen.
FIG. 9 illustrates a flow of initial setting processing of an NW upper-limit and an I/O upper-limit.

Referring to FIG. 8, there is illustrated an example of a NW allocation policy setting screen 800.

The NW allocation policy setting screen 800 is GUI (Graphical User Interface) and a setting screen for the server 10. The settings executed by use of this NW allocation policy setting screen 800 may be applied to any other servers in addition to the server 10. Alternatively, an NW allocation policy setting screen may be arranged for each of other servers.

The NW allocation policy setting screen 800 has a VM ID 801, an allocation receive quantity 802, and an allocation send quantity 803 for each VM 41. The VM ID 801 is fixedly displayed in advance but may be added or edited by the manager of the computer system. For each of the allocation receive quantity 802 and the allocation send quantity 803, setting values are manually inputted by the manager.

In addition, the NW allocation policy setting screen 800 has an NW upper-limit threshold value 811, an NW lower-limit threshold value 812, an I/O upper-limit threshold value 813, an I/O lower-limit threshold value 814, and a setting button 821. For each of the NW upper-limit threshold value 811, the NW lower-limit threshold value 812, the I/O upper-limit threshold value 813, and the I/O lower-limit threshold value 814, a setting value is manually inputted by the manager.

The setting values (data) inputted via the NW allocation policy setting screen 800 may be stored in the memory 21 on the management server 20 or, instead thereof or in addition thereto, these setting values (data) may be reflected (stored) from the management server 20 (or not via the management server 20) onto the NW allocation policy 60 in the memory 11 of the server 10. The NW allocation policy setting screen 800 may be displayed on the management server 20, a computer for display (a client, for example) connected to the management server 20, or a computer for display connected to the server 10. When the manager of the computer system clicks the setting button 821, the inputted setting values are reflected on the NW allocation policy 60.

Referring to FIG. 9, there is illustrated a flow of the initial setting processing of the NW upper-limit 53 and the I/O upper-limit 51.

In step 901, when the manager of the computer system inputs setting values into the NW allocation policy setting screen 800, the inputted setting values are reflected on the NW allocation policy 60.

In step 902, the limitation control function 61 sets ½ of the allocation receive quantity 702 as the upper-limit NW receive quantity 603 and ½ of the allocation send quantity 703 as the upper-limit NW send quantity 604 with respect to each VM 41. Namely, the initial value is set for each of the upper-limit NW receive quantity 603 and the upper-limit NW send quantity 604. It should be noted that the reason why the initial value of the upper-limit NW send quantity 604 (the upper-limit NW receive quantity 603) is the allocation send quantity 703×A (the allocation receive quantity 702×A) and A=½ is that there are two elements; NW send (NW receive) and write (read). For example, assume that VM 41*a* writes one half of the data of 200 MB to the virtual volume 43*a* and NW sends the other half. In this case, half the data to be written to virtual volume 43*a* is transferred to another server 10 via the SVM 45 (the storage control function 46), but the quantity of the data to be transferred via the SVM 45 (the storage control function 46) cannot be limited by the NW limitation function 54. On the other hand, the remaining half of the data to be NW sent can be limited by the NW limitation function 54. This is because, as described above, the NW upper-limit 53 includes the upper-limit with respect to the virtual NW I/F 44 in the VM 41. By the reasons mentioned above, the initial value of the upper-limit NW send quantity 604 (the upper-limit NW receive quantity 603) is ½ of the allocation send quantity 703 (½ of the allocation receive quantity 702). However, this is illustrative only, so that the initial value is not limited thereto.

In step 903, the limitation control function 61 sets ½ of the allocation receive quantity 702 as the upper-limit read quantity 503 and ½ of the allocation send quantity 703 as the upper-limit write quantity 504 with respect to each VM 41. Namely, the initial value is set for each of the upper-limit read quantity 503 and the upper-limit write quantity 504. It should be noted that the reason why the initial value of the upper-limit write quantity 504 (the upper-limit read quantity 503) is the allocation send quantity 703×B (the allocation receive quantity 702×B) and B=½ is that there are two elements; NW send (NW receive) and write (read). It also should be noted that, in the VM 41, if there are P virtual volumes 43 (P being a natural number) and (N+1) overwrites are executed (N being the number of other servers to which data is written (transferred) and an integer of 1 or higher), then B=½ may be employed if P=1 and N=2 with respect to any of the upper-limit write quantity 504 and the upper-limit read quantity 503. In other words, for any of the upper-limit write quantity 504 and the upper-limit read quantity 503, the value of B may be determined on the basis of at least one of P and N. For example, if triple overwrites is employed, the quantity of the data transferred from the SVM 45 is doubled as compared with the double overwrites, so that the value of the upper-limit write quantity 504 may further be halved. Namely, the initial value of the upper-limit write quantity 504 may be the allocation send quantity 703×¼ (namely, B=¼). Further, if P=2 or higher, the upper-limit read quantity 503 and the upper-limit write quantity 504 may each be a value obtained by dividing by P (the number of the virtual volumes 43 in one VM 41 (or the application 42). Namely, the following equations may be employed. However, this is illustrative only and therefore the initial value is not limited thereto.

Figure 10:
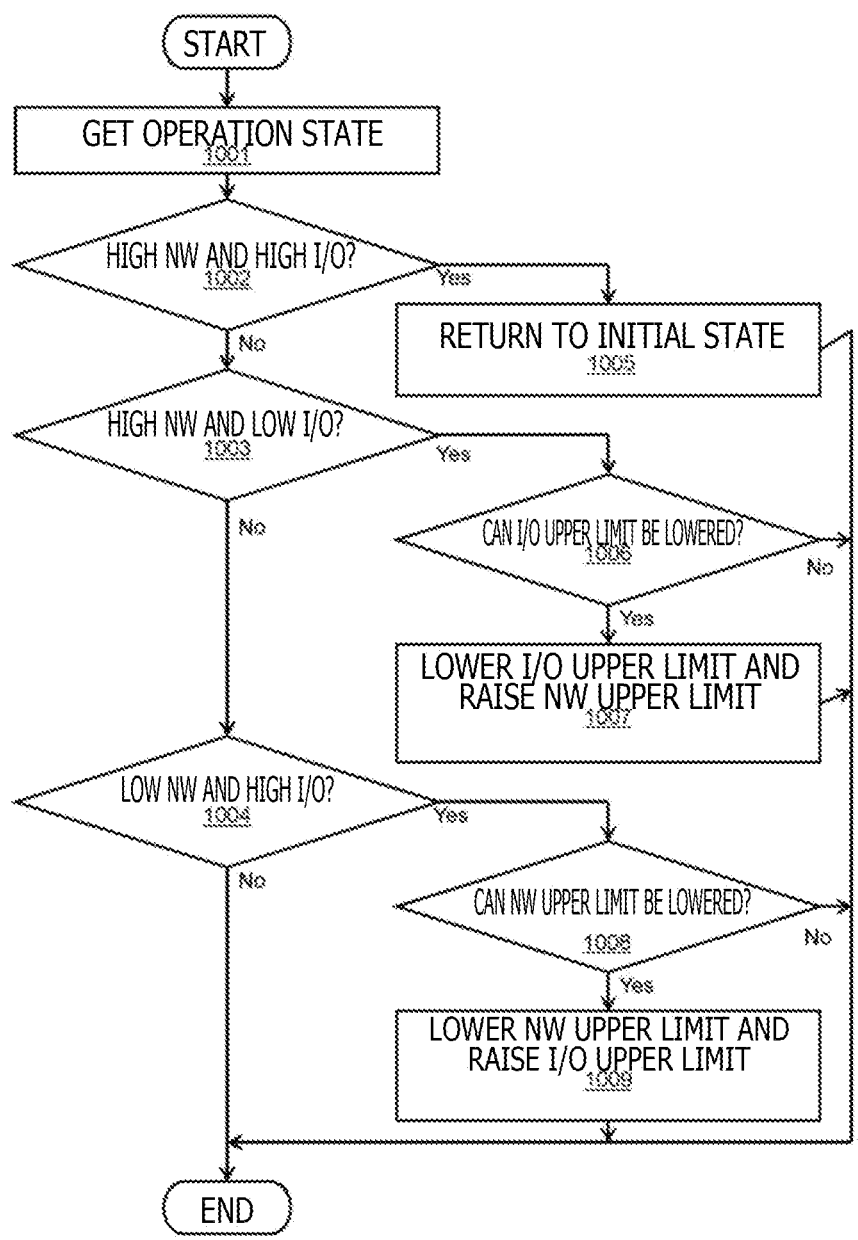
FIG. 10 illustrates a flow of optimization processing of an NW upper-limit and an I/O upper-limit of a limitation control function.

The upper-limit write quantity 504={the allocation send quantity 703×B}×1/N×1/P The upper-limit read quantity 503={the allocation send quantity 703×B}×1/P Referring to FIG. 10, there is illustrated a flow of the optimization processing of the NW upper-limit 53 and the I/O upper-limit 51 of the limitation control function 61. It should be noted that, in the description with reference to FIG. 10, NW send and volume write are used as examples, the same holding with NW receive and volume read.

The processing illustrated in FIG. 10 is executed on a regular basis, every several seconds or several minutes, for example. In step 1001, the limitation control function 61 acquires the operation state 50.

In step 1002, the limitation control function 61 determines whether the ratio of NW send quantity 414 to the upper-limit NW send quantity 604 is in excess of the NW upper-limit threshold value 711 and the ratio of write quantity 404 to the upper-limit write quantity 504 is in excess of the I/O upper-limit threshold value 713. If the determination result of step 1002 is true (step 1002: YES), then the processing goes to step 1005. If the determination result of step 1002 is false (step 1002: NO), then the processing goes to step 1003.

In step 1003, the limitation control function 61 determines whether the ratio of the NW send quantity 414 to the upper-limit NW send quantity 604 is in excess of the NW upper-limit threshold value 711 and the ratio of the write quantity 404 to the upper-limit write quantity 504 is equal to or lower than the I/O upper-limit threshold value 713. If the determination result of step 1003 is true (step 1003: YES), then the processing to goes to step 1006. If the determination result of step 1003 is false (step 1003: NO), then the processing goes to step 1004.

In step 1004, the limitation control function 61 determines whether the ratio of the NW send quantity 414 to the upper-limit NW send quantity 604 is equal to or lower than the NW upper-limit threshold value 711 and the ratio of the write quantity 404 to the upper-limit write quantity 504 is in excess of the I/O upper-limit threshold value 713. If the determination result of step 1004 is true (step 1004: YES), then the processing goes to step 1008. If the determination result of step 1004 is false (step 1004: NO), then the processing comes to an end.

In step 1005, the limitation control function 61 returns each of the upper-limit write quantity 504 and the upper-limit NW send quantity 604 to the value of each of step 902 and step 903.

In step 1006, the limitation control function 61 determines whether the upper-limit write quantity 504 is larger than the I/O lower-limit threshold value 714. If the determination result of step 1006 is true (step 1006: YES), then the processing goes to step 1007. If the determination result of step 1006 is false (step 1006: NO), then the processing comes to an end.

In step 1007, the limitation control function 61 decreases the upper-limit write quantity 504 so as not to get smaller than the I/O lower-limit threshold value 714 and increases the upper-limit NW send quantity 604. The change quantities of the upper-limit write quantity 504 and the upper-limit NW send quantity 604 here are given values. As with step 903, the limitation control function 61 can change at least one of the upper-limit write quantity 504 and the upper-limit NW send quantity 604 on the basis of at least one of the value of N (if data is (N+1)-overwritten) and whether one VM 41 has two or more virtual volumes 43.

In step 1008, the limitation control function 61 determines whether the upper-limit NW send quantity 604 is larger than the NW lower-limit threshold value 712. If the determination result of step 1008 is true (step 1008: YES), then the processing goes to step 1009. If the determination result of step 1008 is false (step 1008: NO), then the processing comes to an end.

In step 1009, the limitation control function 61 decreases the upper-limit NW send quantity 604 so as not to get smaller than the NW lower-limit threshold value 712 and increases the upper-limit write quantity 504. The change quantities of the upper-limit write quantity 504 and the upper-limit NW send quantity 604 here are given values. As with step 903, the limitation control function 61 can change at least one of the upper-limit write quantity 504 and the upper-limit NW send quantity 604 on the basis of at least one of the value of N (if data is (N+1)-overwritten) and whether one VM 41 has two or more virtual volumes 43.

With respect to each VM 41, the allocation receive quantity 702 and the allocation send quantity 703 may be expressed by priority. For example, priority 3 may be 300 MB/s, priority 2 may be 200 MB/s, and priority 1 may be 100 MB/s. Further, for example, if the number of VMs of priority 3 is "a," the number of VMs of priority 2 is "b," and the number of VMs of priority 1 is "c" and the receive and send data quantities of the NW I/F 14 each are 1,000 MB/s, then the allocation receive quantity 702 and the allocation send quantity 703 of the VM 41 with priority 3 may be each 1,000÷(a×3+b×2+c×1)×3, the allocation receive quantity 702 and the allocation send quantity 703 of the VM 41 with priority 2 may be each 1,000÷(a×3+b×2+c×1)×2, and the allocation receive quantity 702 and the allocation send quantity 703 of the VM 41 with priority 2 may be each 1,000÷(a×3+b×2+c×1)×1. Namely, the allocation send quantity 703 (the allocation receive quantity 702) of the VM 41 having priority X (X being a natural number) may be determined on the basis of the value of X, the number of priorities (for example, in the case of priority 1, priority 2, and priority 3, the number of priorities=3), the number of VMs for each priority, and the send data quantity (receive data quantity) of the NW I/F 14.

Each of the NW upper-limit threshold value 711 and the I/O upper-limit threshold value 713 is lower than 100% and higher than 0%. This is because, if the I/O upper-limit threshold value 713 gets to 100% (the maximum value) or 0% (the minimum value), a situation occurs in which write is desired but cannot be executed or write is not desired cannot be determined (whether it is desired to increase the upper-limit write quantity 504 or it is not desired cannot be determined). This holds the same with the NW upper-limit threshold value 711.

The above is the description of embodiment 1.

In accordance with the write of the 100 MB data (the data of 100 MB) from a VM, the SVM transfers the 100 MB data to the SVM of another server. According to one comparison example, if the upper limit of NW send quantity is set with respect to the VM concerned, the NW limitation control function can limit the data from the VM concerned not via SVM to a level equal to or lower than the upper limit, but cannot limit the quantity of the data from the VM concerned via SVM. Therefore, if the second VM attempts to transfer data not via SVM while the first VM is writing large quantities of data, the write of the first VM presents a bottleneck, thereby preventing the delivery of the data transfer performance expected for the second VM.

On the other hand, in one comparison example, given the upper limit (500 MB/s, for example) of NW send quantity with respect to an SVM, if the 500 MB data is written to each of the first VM and the second VM, the SVM attempts to transfer the data of the total of 1000 MB, but the data quantity to be transferred is limited to the upper limit (500 MB/s) of NW send quantity with respect to the SVM. Therefore, no expected write performance can be delivered with respect to both the first VM and the second VM.

According to the present embodiment, the problems described above can be solved.

Namely, according to the present embodiment, a sum of the NW send quantity 414 (the arrow 80, for example) corresponding to the VM 41 (the 41a, for example) and the NW send quantity (the NW send quantity from the SVM 45) due to the write of the VM 41 concerned gets equal to or lower than the value of the allocation send quantity 703 of the VM 41 concerned. The upper-limit NW receive quantity 603 and the upper-limit read quantity 503 of each VM 41 are also controlled in the same manner as above. Setting the sum of the allocation send quantity 703 of the VM 41 using the NW I/F 14 to a value equal to or lower than the send upper-limit value of the NW I/F 14 concerned can prevent the NW I/F 14 from becoming a bottleneck, thereby preventing a particular VM 41 from affecting the performance of other VMs 41.

Further, according to the present embodiment, the sum of the NW receive quantity 413 of the VM 41 (41a, for example) and the NW receive quantity (the NW receive quantity from the SVM 45) due to the read of the VM 41 concerned gets equal to or lower than the value of the allocation receive quantity 702 of the VM 41 concerned. Setting the sum of the allocation receive quantities 702 of the VM 41 using the NW I/F 14 to a value equal to or lower than the receive upper-limit value of the NW I/F 14 concerned can prevent the NW I/F 14 from presenting a bottleneck, thereby preventing a particular VM 41 from affecting the performance of other VMs 41.

Still further, according to the present embodiment, the initial value of each of the upper-limit read quantity 503 and the upper-limit NW receive quantity 603 is a half of the allocation receive quantity 702. The initial value of each of the upper-limit write quantity 504 and the upper-limit NW send quantity 604 is a half of the allocation send quantity 703. Thus, in the initial state, a use area of each of the upper-limit write quantity 504 and the upper-limit NW send quantity 604 (the use area of each of the upper-limit read quantity 503 and the upper-limit NW receive quantity 603) can be allocated.

Embodiment 2

The following describes embodiment 2. In the following description, the differences from embodiment 1 are mainly described, the description of common points with embodiment 1 being skipped or simplified.

Figure 11:
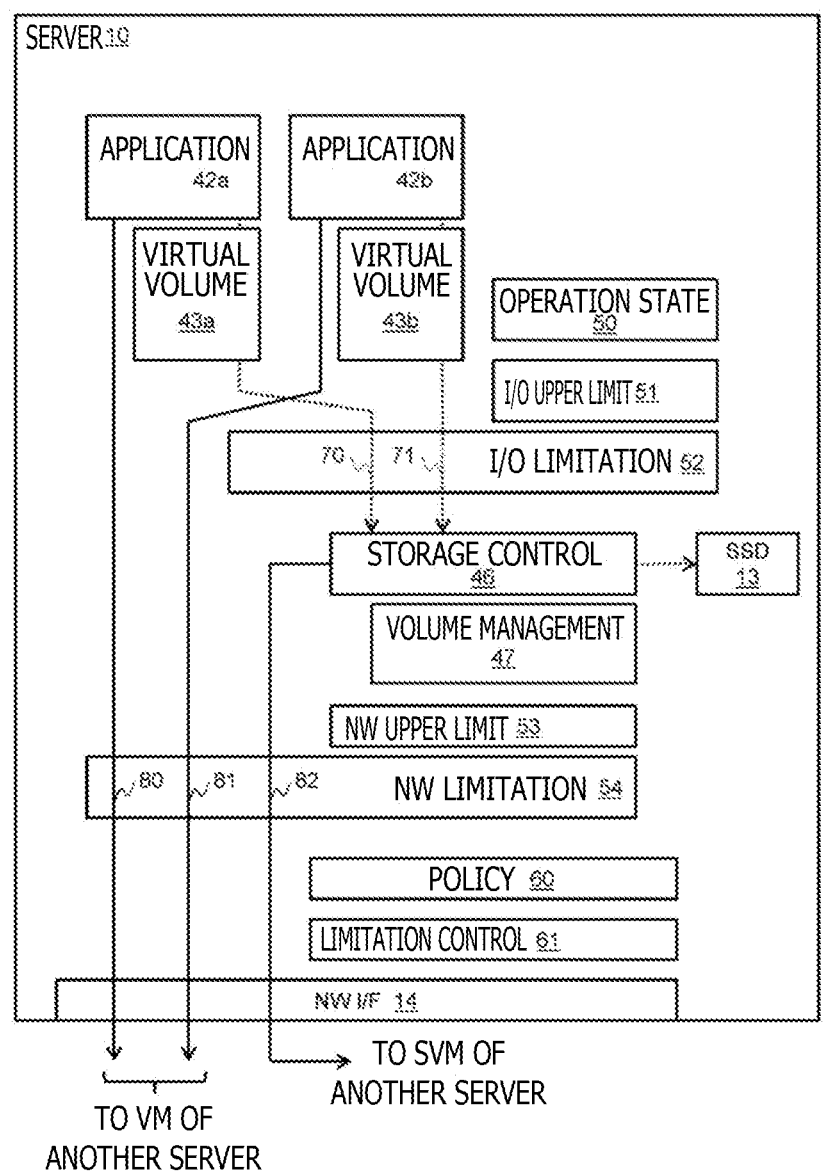
FIG. 11 illustrates a configuration of a server related with embodiment 2.

Referring to FIG. 11, there is illustrated one example of a configuration of a server related with embodiment 2.

In embodiment 1, the read quantity 403, the write quantity 404, the NW receive quantity 413, the NW send quantity 414, the upper-limit read quantity 503, the upper-limit write quantity 504, the upper-limit NW receive quantity 603, the upper-limit NW send quantity 604, the allocation receive quantity 702, and the allocation send quantity 703 are arranged for each VM 41; in embodiment 2, however, as illustrated in FIG. 11, the read quantity 403, the write quantity 404, the NW receive quantity 413, the NW send quantity 414, the upper-limit read quantity 503, the upper-limit write quantity 504, the upper-limit NW receive quantity 603, the upper-limit NW send quantity 604, the allocation receive quantity 702, and the allocation send quantity 703 may be arranged for each application 42. The hypervisor 40, the VM 41, and the SVM 45 may not be arranged. Therefore, the data transfer via or not via the SVM 45 is the data transfer via or not via the storage control function 46.

It should be noted that the management of the read quantity 403, the write quantity 404, the NW receive quantity 413, the NW send quantity 414, the upper-limit read quantity 503, the upper-limit write quantity 504, the upper-limit NW receive quantity 603, the upper-limit NW send quantity 604, the allocation receive quantity 702, and the allocation send quantity 703 for each application 42 may be employed also in the configuration of embodiment 1 (namely, the configuration in which the VM 41 and the SVM 45 are arranged).

While some preferred embodiments of the present invention have been described using specific terms, such description is for illustrative purpose only, and it is to be understood by those skilled in the art that the present invention is practicable on various other forms.

For example, on the basis of the description done above with respect to NW send and volume write, the following expressions are possible with respect to NW receive and volume read.

(Expression 1)

A computer including: a storage device; an NW I/F connected to one or more other computers; and a processor configured to execute one or more entities, which in said processor sets a sum of an upper-limit NW receive quantity and an upper-limit read quantity to a level equal to or lower than an allocation receive quantity that is a receive quantity allocated for the entity concerned with respect to each of said one or more entities; with respect to each of said one or more entities, said upper-limit receive quantity is an upper-limit value of an NW receive quantity that is a quantity of data to be received per unit time via said NW I/F; and with respect to each of said one or more entities, said upper-limit read quantity is an upper-limit value of a read quantity that is a quantity of data to be read per unit time to by said logical volume recognized by the entity concerned.

(Expression 2)

The computer according to expression 1 above which in, with respect to each of said one or more entities, said upper-limit write quantity is smaller as the number of logical volumes recognized by the entity concerned gets larger.

(Expression 3)

The computer according to expression 1 or 2 in which, with respect to each of said one or more entities, at least one initial value of said upper-limit NW receive quantity and said upper-limit read quantity, is a half of said allocation receive quantity of the entity concerned.

(Expression 4)

The computer according to any one of expressions 1 through 3 in which, the above-mentioned processor, with respect to each of the above-mentioned one or more entities, adjusts the above-mentioned upper-limit NW receive quantity and the above-mentioned upper-limit read quantity while maintaining a sum of the above-mentioned upper-limit NW receive quantity and the above-mentioned upper-limit read quantity is equal to or lower than the above-mentioned allocation send quantity.

(Expression 5)

The computer according to expression 4 in which, the above-mentioned processor, with respect to each of the above-mentioned one or more entities, adjusts the above-mentioned upper-limit NW receive quantity and the above-mentioned upper-limit read quantity on the basis of whether a ratio of an NW read quantity of the entity concerned to the above-mentioned upper-limit NW read quantity is in excess of an NW upper-limit threshold value and a ratio of a read quantity to the above-mentioned upper-limit read quantity is in excess of an I/O upper-limit threshold value.

(Expression 6)

The computer according to expression 4 or 5 in which, if, with respect to each of the above-mentioned one or more entities, a ratio of an NW receive quantity of the entities concerned to the above-mentioned upper-limit NW receive quantity is in excess of an NW upper-limit threshold value and a ratio of a read quantity to an upper-limit read quantity is in excess of an I/O upper-limit threshold value, then an adjustment of the above-mentioned upper-limit NW receive quantity and the above-mentioned upper-limit receive quantity is to return each of the above-mentioned upper-limit NW receive quantity and the above-mentioned upper-limit read quantity to an initial value thereof.

(Expression 7)

The computer according to any one of expressions 4 through 6 in which, if, with respect to each of the above-mentioned one or more entities, a ratio of an NW receive quantity of the entity concerned to the above-mentioned upper-limit NW receive quantity is in excess of an NW upper-limit threshold value and a ratio of a write quantity to the above-mentioned upper-limit read quantity is equal to or lower than an I/O upper-limit threshold value, then an adjustment of the above-mentioned upper-limit NW read quantity and the above-mentioned upper-limit read quantity is to increase the above-mentioned upper-limit NW receive quantity and decrease the above-mentioned (Expression 8)

The computer according to any one of 4 through 7 in which, if, with respect to each of the above-mentioned one or more entities, a ratio of an NW receive quantity of the entity concerned to the above-mentioned upper-limit NW receive quantity is equal to or lower than an NW upper-limit threshold value and a ratio of a read quantity to the above-mentioned upper-limit read quantity is in excess of an I/O upper-limit threshold value, then an adjustment of the above-mentioned upper-limit NW receive quantity and the above-mentioned upper-limit read quantity is to decrease the above-mentioned upper-limit NW receive quantity and increase the above-mentioned upper-limit read quantity.

(Expression 9)

The computer according to expression 1 in which the above-mentioned processor executes a storage control program, an I/O limitation program, and an NW (Network) limitation program in addition to the above-mentioned one or more entities; the above-mentioned I/O limitation program limits a read quantity to a level equal to or lower than the above-mentioned upper-limit read quantity with respect to each of the above-mentioned one or more entities; the above-mentioned storage control program, with respect to each of the above-mentioned one or more entities, is able to read data to be read to a logical volume recognized by the entity concerned in whether the above-mentioned storage device and the above-mentioned one or more computers via the above mentioned NW I/F; and the above-mentioned NW limitation program limits a NW receive quantity to a level equal to or lower than the above-mentioned upper-limit NW receive quantity with respect to each of the above-mentioned one or more entities.

DESCRIPTION OF REFERENCE CHARACTERS

10: Server
13: SSD
14: NW I/F
42: Application
43: Virtual volume

The invention claimed is:
1. A computer comprising:
a storage device;
an NW I/F (network interface) connected to one or more other computers;
a storage virtual machine that manages a logical volume; and
at least one processor configured to execute one or more entities, wherein each of the one or more entities is an application or virtual machine that can write data to the logical volume managed by the storage virtual machine and recognized by the entity, and send data via the NW

I/F, and wherein the at least one processor is configured to, for each of the one or more entities, allocate a portion of a total send quantity of the NW I/F to the entity as an allocated send quantity, set an upper-limit NW send quantity and an upper-limit write quantity for the entity, such that a sum of the upper-limit NW send quantity and the upper-limit write quantity is equal to or lower than the allocated send quantity for the entity, wherein each of the upper-limit NW send quantity and the upper-limit write quantity indicates a quantity of data per unit time, restrict writes of data by the entity to the logical volume, managed by the storage virtual machine and recognized by the entity, so as not to exceed the upper-limit write quantity, restrict sending of data by the entity via the NW I/F to the one or more other computers so as not to exceed the upper-limit NW send quantity, and, when data to be written to the logical volume, managed by the storage virtual machine and recognized by the entity, is received, store the data in the storage device, and transfer the data to each of N other computers, from among the one or more computers, for storage in the N other computers, wherein N is an integer greater than zero, wherein the at least one processor is configured to, for each of the one or more entities, set the upper-limit write quantity to be smaller as the value of the N gets larger.

2. The computer according to claim 1, wherein the at least one processor is configured to, for each of the one or more entities, set the upper-limit write quantity to be smaller as a number of logical volumes, managed by the storage virtual machine and recognized by the entity, gets larger.

3. The computer according to claim 1, wherein the at least one processor is configured to, for each of the one or more entities, set each of an initial value of the upper-limit NW send quantity and an initial value of the upper-limit write quantity to half of the allocated send quantity for the entity.

4. The computer according to claim 1, wherein the at least one processor is configured to, for each of the one or more entities, adjust the upper-limit NW send quantity and the upper-limit write quantity while ensuring that the sum of the upper-limit NW send quantity and the upper-limit write quantity never exceeds the allocated send quantity for the entity.

5. The computer according to claim 4, wherein the at least one processor is configured to, for each of the one or more entities:

calculate a first ratio of an NW send quantity of the entity to the upper-limit NW send quantity for the entity; and calculate a second ratio of a write quantity of the entity to the upper-limit write quantity for the entity.

6. The computer according to claim 5, wherein the at least one processor is configured to, for each of the one or more entities, when the first ratio exceeds an NW upper-limit threshold value and the second ratio exceeds an I/O upper-limit threshold value, initialize the upper-limit NW send quantity for the entity to an initial value thereof and initialize the upper-limit write quantity for the entity to an initial value thereof.

7. The computer according to claim 5, wherein the at least one processor is configured to, for each of the one or more entities, when the first ratio exceeds an NW upper-limit threshold value and the second ratio is equal to or lower than an I/O upper-limit threshold value, increase the upper-limit NW send quantity for the entity and decrease the upper-limit write quantity for the entity.

8. The computer according to claim 5, wherein the at least one processor is configured to, for each of the one or more entities, when the first ratio is equal to or lower than an NW upper-limit threshold value and the second ratio exceeds an I/O upper-limit threshold value, decrease the upper-limit NW send quantity for the entity and increase the upper-limit write quantity for the entity.

9. The computer according to claim 5, wherein:

the NW upper-limit threshold value is higher than 0% and lower than 100%; and the I/O upper-limit threshold value is higher than 0% and lower than 100%.

10. The computer according to claim 1, wherein the at least one processor is configured to:

execute a storage control program to store the data in the storage device and transfer the data to each of the N other computers for each of the one or more entities, execute an I/O (Input/Output) limitation program to perform the restriction on the writing of data by each of the one or more entities, and execute an NW (Network) limitation program to perform the restriction on the sending of data by each of the one or more entities.

11. The computer according to claim 1, wherein the NW I/F is an interface that communicates in full duplex, and wherein the at least one processor is configured to, for each of the one or more entities:

allocate a portion of a total receive quantity of the NW I/F to the entity as an allocated receive quantity;

set an upper-limit NW receive quantity and an upper-limit read quantity for the entity, such that a sum of the upper-limit NW receive quantity and the upper-limit read quantity is equal to or lower than the allocated receive quantity for the entity, wherein each of the upper-limit NW receive quantity and the upper-limit read quantity indicates a quantity of data per unit time;

restrict reads of data by the entity from the logical volume, managed by the storage virtual machine and recognized by the entity, so as not to exceed the upper-limit read quantity; and restrict receiving of data by the entity via the NW I/F so as not to exceed the upper-limit NW receive quantity.

12. A computer system comprising a plurality of the computer of claim 1.

13. A data quantity limitation method for a computer having a storage device, an NW I/F (Network Interface) connected to one or more other computers, a storage virtual machine that manages a logical volume, and at least one processor configured to execute one or more entities, wherein each of the one or more entities is an application or virtual machine that is capable of writing data to the logical volume, managed by the storage virtual machine and recognized by the entity, and send data via the NW I/F, wherein the data quantity limitation method comprises, for each of the one or more entities:

allocating a portion of a total send quantity of the NW I/F to the entity as an allocated send quantity;

setting an upper-limit NW send quantity and an upper-limit write quantity for the entity, such that a sum of the upper-limit NW send quantity and the upper-limit write quantity is equal to or lower than the allocated send quantity for the entity, wherein each of the upper-limit NW send quantity and the upper-limit write quantity indicates a quantity of data per unit time;

restricting writes of data by the entity to the logical volume, managed by the storage virtual machine and recognized by the entity, so as not to exceed the upper-limit write quantity;

restricting sending of data by the entity via the NW I/F to the one or more other computers so as not to exceed the upper-limit NW send quantity; and, when data to be written the logical volume, recognized by the entity, is received, storing the data in the storage device, and transferring the data to each of N other computers, from among the one or more computers, for storage in the N other computers, wherein N is an integer greater than zero, wherein, for each of the one or more entities, the upper-limit write quantity is set to be smaller as the value of the N gets larger.

\* \* \* \* \*